United States Patent
Barnes

(10) Patent No.: US 6,241,828 B1
(45) Date of Patent: Jun. 5, 2001

(54) METHOD OF CLEANING OR PURIFYING ELASTOMERS AND ELASTOMERIC ARTICLES WHICH ARE INTENDED FOR MEDICAL OR PHARMACEUTICAL USE

(75) Inventor: Paul Barnes, King's Lynn (GB)

(73) Assignee: Bespak, PLC, Norfolk (GB)

( * ) Notice: Subject to any disclaimer, the term of this patent is extended or adjusted under 35 U.S.C. 154(b) by 0 days.

(21) Appl. No.: 09/155,268

(22) PCT Filed: Apr. 9, 1997

(86) PCT No.: PCT/GB97/01009

§ 371 Date: Sep. 25, 1998

§ 102(e) Date: Sep. 25, 1998

(87) PCT Pub. No.: WO97/38044

PCT Pub. Date: Oct. 16, 1997

(30) Foreign Application Priority Data

Apr. 10, 1996 (GB) .................................................. 9607399

(51) Int. Cl.[7] ...................................................... B08B 3/04
(52) U.S. Cl. ..................................... 134/26; 134/4; 134/6; 134/7; 134/18; 134/19; 134/22.1; 134/22.11; 134/22.12; 134/22.14; 210/634; 510/161; 510/244; 528/493; 528/495
(58) Field of Search ............................ 134/6, 7, 4, 22.1, 134/22.12, 22.14, 18, 19, 26; 210/634; 510/161, 244; 528/493, 495

(56) References Cited

U.S. PATENT DOCUMENTS

| 4,703,105 | | 10/1987 | Allada | 528/483 |
|---|---|---|---|---|
| 5,377,705 | * | 1/1995 | Smith, Jr. et al. | 134/95.3 |
| 5,417,768 | | 5/1995 | Smith, Jr. et al. | 134/10 |
| 5,478,921 | * | 12/1995 | Roby et al. | 528/480 |
| 5,481,058 | | 1/1996 | Blackwell et al. | |
| 5,550,211 | * | 8/1996 | De Crosta et al. | 528/480 |
| 5,670,614 | * | 9/1997 | Roby et al. | 528/480 |
| 5,739,270 | * | 4/1998 | Farmer et al. | 528/501 |
| 5,756,657 | * | 5/1998 | Sawam et al. | 528/487 |
| 5,783,082 | * | 7/1998 | De Simone et al. | 528/634 |
| 5,866,005 | * | 2/1999 | De Simone et al. | 210/634 |
| 5,944,996 | * | 8/1999 | De Simone et al. | 210/634 |
| 6,068,789 | * | 5/2000 | Barnes | 252/160 |

FOREIGN PATENT DOCUMENTS

| 0142894 A2 | 5/1985 | (EP) . |
|---|---|---|
| 0233661 A1 | 8/1987 | (EP) . |
| 0289132 A1 | 11/1988 | (EP) . |
| WO 93/12161 | 6/1993 | (WO) . |
| WO 94/13733 | 6/1994 | (WO) . |
| WO 95/18834 | 7/1995 | (WO) . |
| WO 97/16264 * | 5/1997 | (WO) . |

* cited by examiner

Primary Examiner—Sharidan Carrillo
(74) Attorney, Agent, or Firm—Smith, Gambrell & Russell, LLP.

(57) ABSTRACT

A method is disclosed for removing impurities from an elastomer intended for medical or pharmaceutical use, which includes a step of performing a first solvent extraction process on the elastomer by contacting the elastomer with a first extracting solvent in a non-supercritical state to substantially remove impurities from the elastomer, thereby leaving a residue of said first extracting solvent in the elastomer. The elastomer is there after subjected to a second solvent extraction process, by contacting the elastomer with a second extracting solvent, which is a supercritical fluid or a mixture of super critical fluids, in order to remove substantially reduce the concentration of the residue of the first extracting solvent remaining in the elastomer after the first solvent extraction process.

10 Claims, No Drawings

METHOD OF CLEANING OR PURIFYING ELASTOMERS AND ELASTOMERIC ARTICLES WHICH ARE INTENDED FOR MEDICAL OR PHARMACEUTICAL USE

FIELD OF THE INVENTION

This invention relates to a method of cleaning or purifying elastomers and elastomeric articles which in particular are intended for medical or pharmaceutical uses but also for cleaning or purifying elastomers and elastomeric articles for any use in which impurities in the elastomer might cause problems through leaching or extraction into the adjacent media.

DESCRIPTION OF THE RELATED ART

Pressurised metered dose inhalers [MDIs] have been available over the last thirty years for the administration of medicaments or drugs, primarily to the lungs, for the treatment of asthma and other airway diseases. Additionally, they have been used for the administration of drugs to the lung for systemic absorption, for administration to the oral cavity and for administration into the nose. All of these pressurised inhalers utilise aerosol valves that meter individual doses. These metering valves are constructed of a mixture of metal and/or plastic parts and elastomeric rubbers. Various types of elastomeric rubber are used in these valves and newer types are being continually developed to ensure compatibility with the various aerosol propellants, to provide compatibility with and stability of the drug formulation and to ensure that the valve continues to perform to specification over the several years of storage required of a pharmaceutical product. One consequence of this protracted storage of aerosol packs in which the propellants are in intimate contact with the metering valve is that materials are leached or extracted from the elastomeric rubbers into the drug formulation. These materials which may be extracted from the elastomeric rubbers are a mixture of the chemical ingredients originally used to make the rubber and also new chemicals produced during the vulcanisation of the rubber. These are undesirable in the finished rubber component as they may cause instability of the formulation and/or degradation of the drug substance and therefore loss of potency, or they may impart objectionable tastes or odours to the product and could in extreme cases cause allergic or toxic reactions.

Both the pharmaceutical manufacturers and the valve manufacturers have been aware of the above problems associated with the use of elastomeric rubber compounds and various approaches have been employed to reduce the extractable chemical materials contained in the rubbers. The main approaches have been to formulate rubbers that will provide a lower level of extractable chemical materials or to pre-extract the rubbers before assembly into the metering valve. Because the final intended use of the product is for administration of drugs, the choice of extraction solvent which can be used is very limited for safety and toxicity reasons as there will remain in the rubber after solvent extraction a residue of this solvent which will be extracted into the propellant system. For this reason the most common extraction solvent used to pre-extract rubbers is the chlorofluorocarbon Trichlorofluoromethane [$CCl_3F$] which is included as part of the propellant system in a number of MDIS. Trichlorofluoromethane has a boiling point of 23.8° C. and is often called Propellant 11 which is abbreviated to P11. Due to its boiling point the liquid can generally be used at ambient temperatures.

This pre-extraction has been carried out by a variety of methods ranging from soaking the rubbers in P11 with or without stirring, pumping the P11 through a bed of the rubber components to sophisticated custom-designed extraction apparatus where the material extracted from the rubber is continually removed and the rubber continually provided with a stream of pure P11. These methods generally take several days to achieve extraction although extraction is not complete. The processes are intended to reduce the levels of available extractable chemical materials and it is appreciated that they will not be completely eliminated.

More recently the process known as super critical fluid extraction, SCF extraction, has been developed as a general method of extraction for a variety of materials either to remove impurities or to isolate particularly desired chemical compounds.

In WO93/12161 there is described and claimed a method for cleaning elastomeric articles, in particular components for MDIs comprising extracting phthalates and/or polynuclear aromatic hydrocarbons (PAHs) from the articles by contacting the articles with a supercritical fluid. However, a disadvantage of the use of SCFs is that the choice of SCFs which can be used is limited by pressure and temperature considerations as well as toxicity characteristics because residues of the SCF could remain in the rubber after SCF treatment. Thus for practical purposes SCF extraction is mainly limited to the use of carbon dioxide ($CO_2$) and probably a small number of other chemicals such as nitrous oxide ($N_2O$).

Likewise, traditional rubber extraction solvents have also been limited by toxicity consideration in view of the residual solvent remaining in the rubber after extraction, and for practical purposes the choice has usually been between P11, ethanol, ethanol/water mixture and water and a small number of other possibilities.

However, it would be useful if it were possible to use other solvents which, although prevented by toxicity considerations from use in hitherto known rubber extraction procedures may have particularly favourable solvent properties for certain of the impurities occurring in the rubbers.

BRIEF SUMMARY OF THE INVENTION

U.S. Pat. No. 5,417,768 describes a method of removing liquids and solids from the surfaces of workpieces which comprises firstly flushing a primary solvent through a pressurizable vessel containing the workpieces and thereafter flushing carbon dioxide through the vessel at a liquifying pressure to remove remaining contaminated primary solvent from the surfaces of the workpieces.

U.S. Pat. No. 5,481,058 describes the use of a supercritical fluid, such as one comprising 1,1,1,2-tetrafluorethane, as an extractant for example of impurities in rubbers used in metered dose inhalers.

According to the present invention there is provided a method of cleaning or purifying elastomers and elastomeric articles which are intended for medical or pharmaceutical use which method comprises firstly performing a solvent extraction process on the elastomer or elastomeric article using a solvent in a non-supercritical state to substantially remove impurities therefrom and thereafter subjecting the elastomer or elastomeric article to a further solvent extraction step using a supercritical fluid or a mixture of supercritical fluids in order to remove or substantially reduce the concentration of the residue of extracting solvent remaining in the elastomer or elastomeric article after the first solvent extraction elastomeric article after the first solvent extraction process.

It should be understood that the supercritical fluid used in the present invention is not itself employed to remove impurities in the elastomer but rather to remove or substantially reduce the residue of extracting solvent which has been used previously to remove these impurities. Thus it will be seen that the present invention inter alia enables the use for the initial extraction of impurities of extracting solvents would not meet the appropriate toxicity requirements if they left significant residues in the rubber after treatment, and if these residues were not subsequently removed as in the present invention. Thus, for example, in addition to the conventional extracting solvents of which examples are referred to above, ketones such as acetone, aliphatic alcohols, partially or fully halogenated alkanes, or polyhydric alkanes could be used in the method of the present invention as an extracting solvent in the first extraction stage.

The primary characteristics of the SCFs used in the method of the present invention are firstly that they should be safe for use with humans, secondly that they should have a sufficiently low critical temperature, ideally less than 100° C., for practical considerations, and thirdly they should also be good extractants for the solvent or solvents used in the first stages of the method but not necessarily for the original impurities in the rubber which will of course have been already substantially extracted by the solvent used in the first stage of the method.

EXAMPLES

The actual practical procedures and apparatus for performing the method of the present invention are conventional, the first stage of the method being conventional extraction-purification procedures for elastomers intended for medical and pharmaceutical use, whilst the second stage of the method employs procedures and apparatus which are conventional in the handling of supercritical fluid extractions, the selection of appropriate conditions, temperatures, pressures and timing of treatment being within the skill of the art.

Following are three outline examples of the method of the present invention.

Example 1

An elastomeric rubber component for an MDI is extracted by soaking in P11 for 3 days. The P11 is then drained away and the rubber components allowed to air dry. The residual and variable amount of P11 remaining in the extracted rubber is reduced by SCF extraction using Nitrous Oxide for 4 hours.

Example 2

Elastomeric rubber components for MDIs are extracted using ethanol for 48 hours. After this period the liquid ethanol is drained off and more of the ethanol is removed from the rubbers by air drying in situ. Following this the residual ethanol in the rubbers is further reduced by SCF extraction using Carbon Dioxide at 50° C. for 4 hours.

Example 3

Rubber components for MDIs are extracted by reflux with acetone at its boiling point of 56.5° C. for 24 hours. The acetone containing the extractables is drained away and the rubber components oven dried at 60° C. for 6 hours. Residual acetone in the components is removed using SCF extraction with Carbon Dioxide.

What is claimed is:

1. A method of removing impurities from an elastomer intended for medical or pharmaceuticals use, which methods comprises:

performing a first solvent extraction process on the elastomer by contacting the elastomer with a first extracting solvent in a non-supercritical state to substantially remove impurities therfrom, therby leaving a residue of said extracting solvent in the elastomer; and thereafter subjecting the elastomer to a second solvent extraction process by contacting the elastomer with a second extracting solvent which is supercritical fluid or a mixture of a supercritical fluids, in order to remove or substantially reduce a concentration of said residue of said first extracting solvent remaining in the elastomer after said first solvent extraction process.

2. The method as claimed in claim 1, wherein the supercritical fluid is carbon dioxide.

3. The method as claimed in claim 1, wherein said first extracting solvent comprises a solvent which is toxic, and wherein said a second solvent extraction process removes said residue so as to render said elastomer suitable for medical or pharmaceutical use.

4. The method as claimed in claim 1, wherein the first extracting solvent is a ketone.

5. The method as claimed in claim 1, wherein the first extracting solvent is an aliphatic alcohol.

6. The method as claimed in claim 1, wherein the first extracting solvent is a partially or fully halogenated alkane.

7. The method as claimed in claim 1, wherein the first extracting solvent is a polyhydric alkane.

8. The method as claimed in claim 1, wherein contacting the elastomer with said first extracting solvent comprises soaking the elastomer with said first extracting solvent, and said method further comprises draining said first extracting solvent away from contact with said elastomer and drying said elastomer prior to said second solvent extraction process.

9. The method as claimed in claim 3, wherein the residue of said first extracting solvent is removed by said second solvent extracting process such that the elastomer can be used in a metered dose inhaler.

10. The method as claimed in claim 4, wherein the ketone is acetone.

* * * * *